US009547522B2

(12) United States Patent
Gaiarsa

(10) Patent No.: US 9,547,522 B2
(45) Date of Patent: Jan. 17, 2017

(54) METHOD AND SYSTEM FOR RECONFIGURABLE VIRTUAL SINGLE PROCESSOR PROGRAMMING MODEL

(71) Applicant: Wind River Systems, Inc., Alameda, CA (US)

(72) Inventor: Andrew Gaiarsa, Carp (CA)

(73) Assignee: WIND RIVER SYSTEMS, INC., Alameda, CA (US)

( * ) Notice: Subject to any disclaimer, the term of this patent is extended or adjusted under 35 U.S.C. 154(b) by 55 days.

(21) Appl. No.: 14/249,947

(22) Filed: Apr. 10, 2014

(65) Prior Publication Data

US 2015/0293780 A1 Oct. 15, 2015

(51) Int. Cl.
*G06F 9/46* (2006.01)
*G06F 9/50* (2006.01)

(52) U.S. Cl.
CPC ............. *G06F 9/465* (2013.01); *G06F 9/5016* (2013.01); *G06F 9/5088* (2013.01)

(58) Field of Classification Search
None
See application file for complete search history.

(56) References Cited

U.S. PATENT DOCUMENTS

| 6,202,080 | B1* | 3/2001 | Lu et al. | 718/105 |
| 8,918,372 | B1* | 12/2014 | Guo et al. | 707/692 |
| 2005/0228967 | A1* | 10/2005 | Hirairi | G06F 1/329 712/1 |
| 2006/0123422 | A1* | 6/2006 | Felter et al. | 718/105 |
| 2012/0180063 | A1* | 7/2012 | Rawlings et al. | 718/104 |
| 2015/0039645 | A1* | 2/2015 | Lewis | 707/769 |

* cited by examiner

*Primary Examiner* — Adam Lee
(74) *Attorney, Agent, or Firm* — Fay Kaplun & Marcin, LLP

(57) ABSTRACT

A non-transitory computer-readable storage medium storing a set of instructions that are executable by a processor. The set of instructions, when executed by one or more processors of a multi-processor computing system, causes the one or more processors to perform operations including initiating a first processor of the multi-processor computing system with an operating system image of an operating system, the operating system image including a predetermined object map, initiating a second processor of the multi-processor computing system with the operating system image, placing a plurality of system objects with corresponding processors according to the predetermined object map, receiving a triggering event causing a change to the predetermined object map and relocating one of the system objects to a different one of the processors based on the change to the predetermined object map.

18 Claims, 5 Drawing Sheets

| | NODE_ID | Priority | Entry Point | Stack Memory | Stack Size |
|---|---|---|---|---|---|
| 210 | 0 | 56 | master | masterStackBuf | 1024 |
| 212 | 0 | 42 | plotter | plotterStackBuf | 512 |
| 214 | 1 | 13 | HostIO1 | HostIO1StackBuf | 512 |
| 216 | 1 | 21 | HostIO2 | HostIO2StackBuf | 512 |
| 218 | 1 | 52 | loader | loaderStackBuf | 2048 |

220 / 230 / 240 / 250 / 260

Object Table 200

Figure 2

METHOD AND SYSTEM FOR RECONFIGURABLE VIRTUAL SINGLE PROCESSOR PROGRAMMING MODEL

BACKGROUND

Computing systems using multiple processing cores are commonly used to provide increased performance over single-core systems. A variety of multi-processor programming paradigms exist to provide for division of tasks among the different cores of a multi-core computing environment. However, some multi-processor programming paradigms, such as symmetric multiprocessing and virtual single processing, may have drawbacks that limit their usefulness.

SUMMARY OF THE INVENTION

A non-transitory computer-readable storage medium storing a set of instructions that are executable by a processor. The set of instructions, when executed by one or more processors of a multi-processor computing system, causes the one or more processors to perform operations including initiating a first processor of the multi-processor computing system with an operating system image of an operating system. The operating system image includes a predetermined object map. The operations also include initiating a second processor of the multi-processor computing system with the operating system image. The operations also include placing a plurality of system objects with corresponding processors according to the predetermined object map. The operations also include receiving a triggering event causing a change to the predetermined object map. The operations also include relocating one of the system objects to a different one of the processors based on the change to the predetermined object map.

A system includes a plurality of processors and a memory shared by the plurality of processors. The memory stores an operating system image. The operating system image includes a predetermined object map placing a plurality of system objects with corresponding processors. The system is initiated by initiating a first processor of the plurality of processors with the operating system image and initiating a second processor of the plurality of processors with the operating system image. A kernel of the system receives a triggering event causing a change to the predetermined object map and relocates one of the system objects based on the change to the predetermined object map.

A method includes initiating a first processor of a plurality of processors of a multi-processor computing system with an operating system image of an operating system. The operating system image includes a predetermined object map. The method also includes initiating a second processor of the plurality of processors of the multi-processor computing system with the operating system image. The method also includes placing a plurality of system objects with corresponding processors according to the predetermined object map. The method also includes receiving a triggering event causing a change to the predetermined object map. The method also includes relocating one of the system objects based on the change to the predetermined object map.

BRIEF DESCRIPTION OF THE DRAWINGS

FIG. 2 shows a task object table of an exemplary system implementing a reconfigurable virtual single processor programming paradigm.

DETAILED DESCRIPTION

Figure 1:
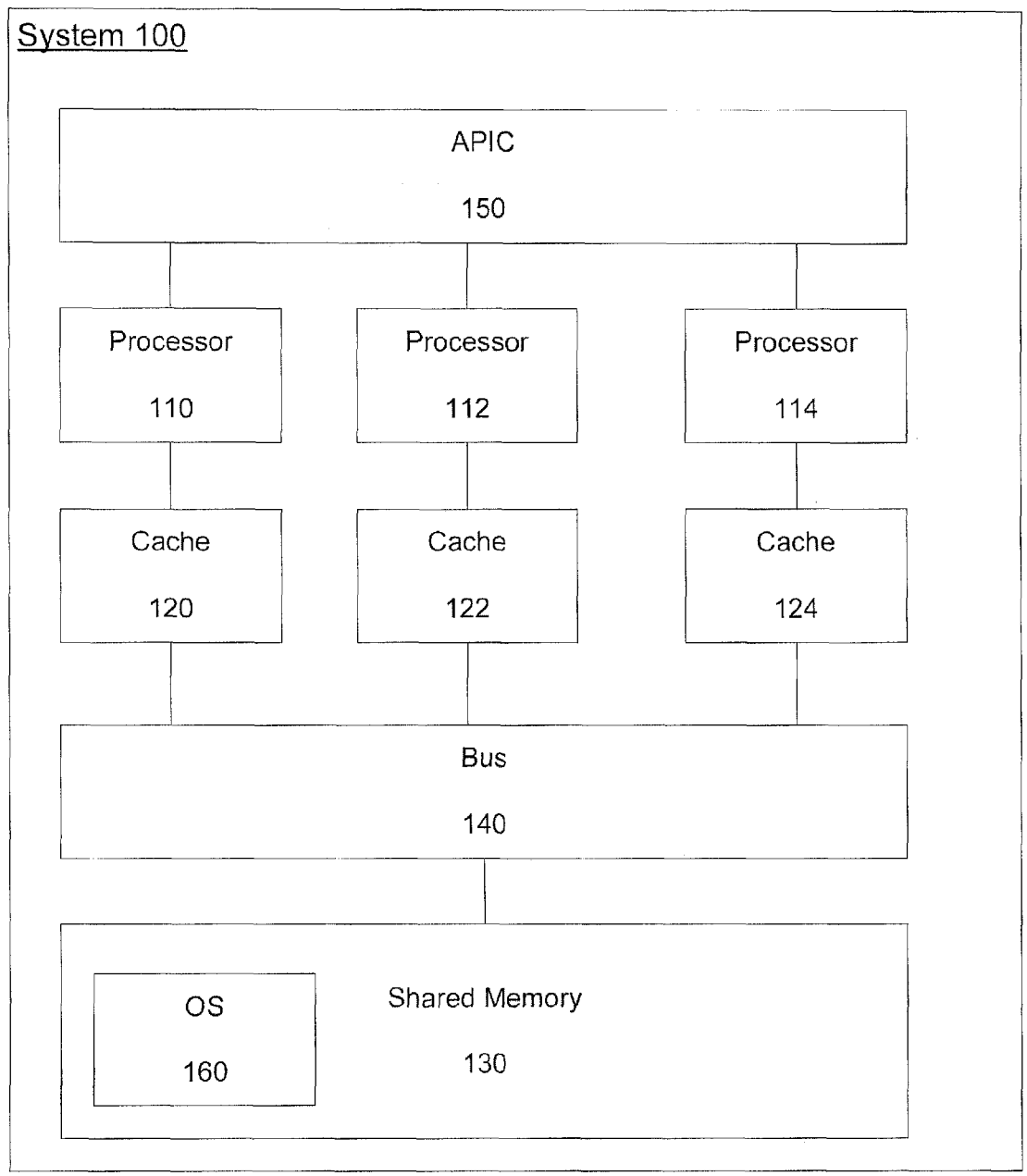
FIG. 1 schematically illustrates a multi-processor computing system capable of implementing a reconfigurable virtual single processor programming paradigm according to an exemplary embodiment.

The exemplary embodiments may be further understood with reference to the following description and the related appended drawings, wherein like elements are provided with the same reference numerals. Specifically, the exemplary embodiments relate to methods and systems for reconfigurable virtual single processor programming.

Multi-core processing arrays are commonly used in modern computing systems to provide greater processing capacity than single-core processors. It should be understood that multi-core processing arrays may refer to systems having multiple single core processors or one or more processors that have multiple cores. In order to utilize multi-core processors, a system must employ an architecture that governs the division of tasks among the different processors. As will be known to those of skill in the art, different multi-processing architectures may have different strengths and weaknesses.

Symmetric multiprocessing ("SMP") is one commonly used multiprocessing architecture. In SMP, two or more processors share a main memory area and access to devices, and are operated by a single operating system ("OS") that treats all processors equally. Any task may execute on any processor, though tasks may have affinity for a particular processor. Objects such as message queues and semaphores have no particular "home" location. The OS of a SMP system may automatically move tasks between the various processors to efficiently balance the workload. However, because locking is required to govern access to shared resources, the overall efficiency of the system may be hampered as processors must wait to access resources that are required to execute tasks.

Virtual single processing ("VSP") is another multiprocessing architecture. In VSP, different and unique configurations of the operating system are executed on each of two or more processors. Tasks and objects are restricted to execute on specific processors, rather than being freely movable from one processor to another as in SMP; thus, there is a limited set of tasks that can execute on a given processor, but tasks can be initiated or terminated as needed. The location of various objects is specified at build time of the executable image and cannot be changed at runtime. Applications running in a VSP environment have the appearance of executing on a single processor, rather than being distributed across multiple processors. VSP does not require the use of locks to control access to resources, and, thus, provides for greater scalability than SMP. However, because tasks and all kernel objects (e.g., mailboxes, semaphores, channels, etc.) are delegated to specific processors at image build time, the OS cannot provide for efficient load redistribution among the processors to adapt to changing conditions.

The exemplary embodiments describe a reconfigurable virtual single processor ("rVSP") architecture that may provide for efficient scalability in the same manner as VSP while allowing for redistribution of tasks in a similar manner to SMP to allow for efficient load balancing at runtime. FIG. 1 illustrates, schematically, hardware architecture of exemplary system 100 capable implementing the rVSP architecture. It will be apparent to those of skill in the art that the architecture shown in FIG. 1 is a tightly coupled shared-memory architecture similar to that used in SMP systems, and that the type of system architecture of the exemplary system 100 may vary based on the software executed within the system 100. The system 100 includes a plurality of processors 110, 112 and 114; it will be apparent to those of skill in the art that the number of processors shown is only exemplary and that any number of processors greater than one may be used in different implementations. Each of the processors 110, 112 and 114 has a corresponding cache 120, 122 and 124.

The system 100 also includes a memory 130 that is shared by all the processors 110, 112 and 114 that comprise the system. The memory 130 may be a high-bandwidth shared memory. The processors 110, 112 and 114 are coupled to the memory 130 by a bus 140. The processors 110, 112 and 114 communicate with one another by way of an advanced programmable interrupt controller ("APIC") 150, which supports inter-processor interrupts. The memory 130 stores an operating system ("OS") 160 to operate the system 100 as will be described in further detail hereinafter.

Each of the processors 110, 112 and 114 may execute a same binary image of the OS 160 that is generated at compile time. When the system 100 is initiated, a first one of the processors 110, 112 and 114 (e.g., processor 110) may execute the binary image first to initiate the operation of the system 100, and the remaining processors (e.g., processors 112 and 114) may follow subsequently. The use of a single executable image for each of the processors 110, 112 and 114 is a similarity of rVSP to SMP, whereas a multiprocessing system using a VSP architecture uses a unique binary executable image for each of its processors. The executable image may include a default object table that will specify an initial allocation of objects, tasks, etc., among the processors 110, 112 and 114, but the allocation may be modified by the system 100 as will be described below.

The exemplary system 100 implementing an rVSP architecture may further differ from a system implementing a VSP architecture in the construction of its internal object tables. In a system implementing a VSP architecture, a 32-bit object identifier of each object (e.g., a queue, a semaphore, etc.) specifies a node (e.g., a processor) that owns each object; as used herein, when a node "owns" an object, that node is the only node that can change the state of the object. Because objects do not move between nodes in a VSP architecture, such node specifications may be static. In contrast, the object tables of the exemplary system 100 are dynamic in order to support runtime updating of the owning nodes of each object.

FIG. 2 shows an exemplary task object table 200 of a system 100 executing an rVSP architecture. The task object table 200 includes various information for each of a plurality of task objects 210, 212, 214, 216 and 218. The inclusion of five objects is only exemplary and those of skill in the art will be aware that the number of objects included in a task object table 200 will vary among different systems, and during the course of execution of systems such as the system 100. For each of the objects 210, 212, 214, 216 and 218, the task object table 200 includes a node identifier value 220, identifying a node of the system 100 on which the corresponding object currently resides. The task object table 200 also includes a priority value 230 for each object, which identifies the priority of the corresponding object.

The task object table 200 also includes an entry point 240 for each object, which identifies the entry point for the corresponding object. The task object table 200 also includes a stack memory identifier 250 for each object, which identifies a designation for data relating to the corresponding object in the memory stack of the system 100. Last, for each of the objects 210, 212, 214, 216 and 218, the task object table 200 includes a stack size 260 indicating a size of each object in the memory stack of the system 100. In addition to the task object table 200, a system executing the rVSP architecture may also include other types of object tables (e.g., a mutex object table). Save for the node identifier, different object tables may include different fields than those described above with reference to task object table 200, such that the fields for each object table are appropriate for the type of objects contained in the object table. For example, only a task object table may include a priority field.

One difference between the task object table 200 of a system using an rVSP system architecture and the object table of a system using a VSP system architecture is the nature of the node identifier value 220. As noted above, in a VSP system, objects have fixed placements at one of the processors of the system. Thus, the node identifier value of an object in an object table of a VSP system is a static, unchanging value. In contrast, in an rVSP system, objects may be relocated from one processor to another. Thus, the node identifier value 220 of each object in the task object table 200 may be changed at runtime.

Because a system 100 with an rVSP architecture includes a dynamic object table as described above, the system 100 may enable objects and tasks to be redistributed from one processor to another (e.g., from processor 110 to processor 112, etc.). It will be apparent to those of skill in the art that this differs from a VSP architecture, which includes a static object table and different images for each processor, and does not enable objects and tasks to be moved from one processor to another. The ability to move objects or tasks from one processor to another is a similarity between rVSP and SMP, but the system 100 may be operative to move objects or tasks "manually" through an action by the OS 160, as opposed to the automatic redistribution performed by an SMP architecture any time a scheduling action occurs. The term "manually" means that a specific triggering event is used to initiate the redistribution of objects, rather than a scheduling action. It is envisioned that such triggering events are rare occurrences compared to scheduling events. Additionally, while SMP only provides for the movement of task objects between nodes, in the system 100 implementing rVSP architecture, all objects, not just task objects, may be moved between nodes.

There may be a variety of manners in which the system 100 including an rVSP architecture may accomplish a reconfiguration event (e.g., moving an object or a task from one processor to another). In one embodiment, the triggering event may be an algorithm implemented to perform load balancing when one or more of the processors 110, 112 and 114 comprising the system 100 is either brought offline or brought online. Such an algorithm may involve quantifying the load due to each object or task that is being executed by the system 100 and dividing the load evenly among the processors 110, 112 and/or 114 that are online.

Figure 3:
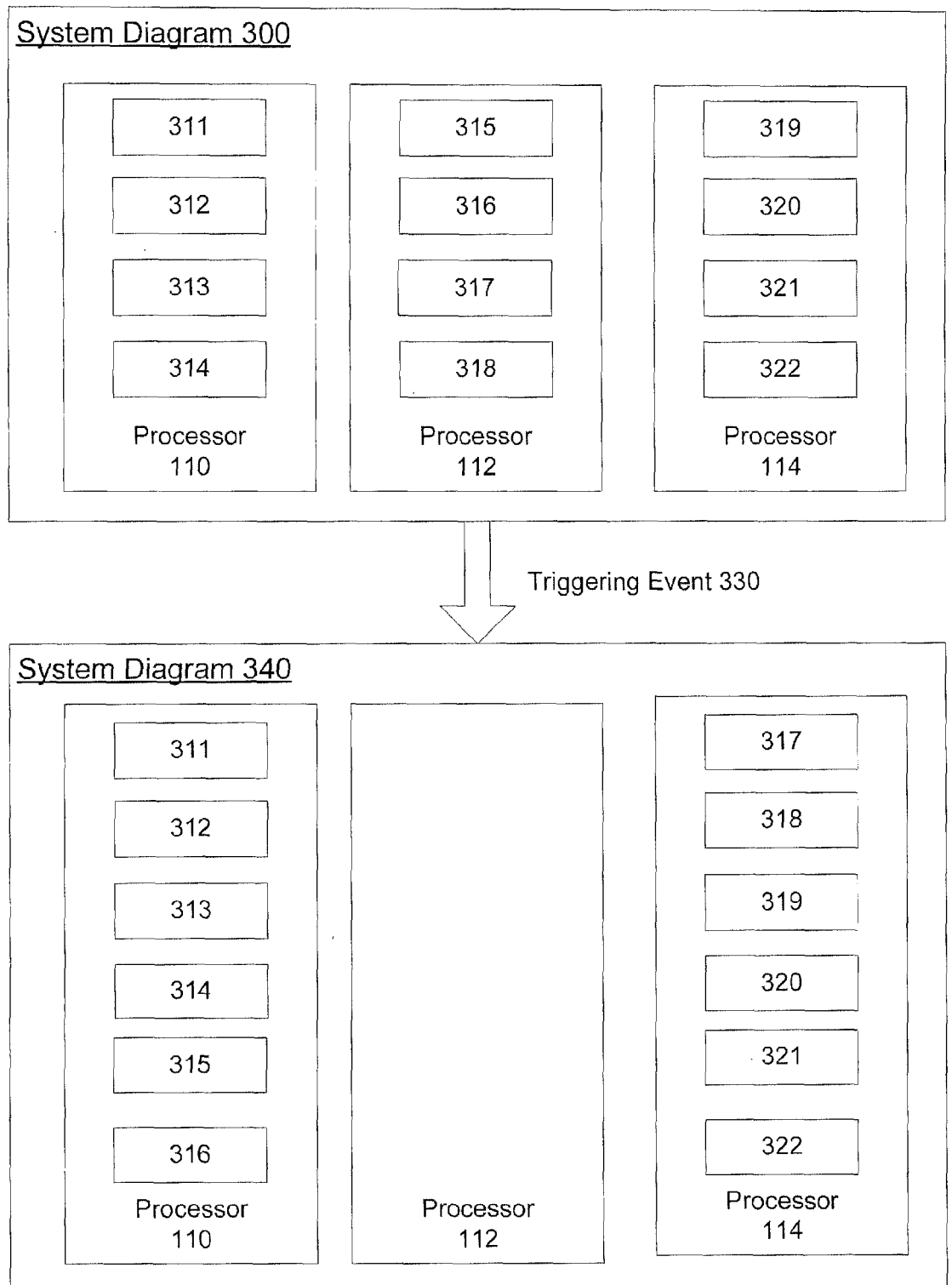
FIG. 3 shows system diagrams of a first exemplary redistribution of tasks among processors within a multi-processor computing system such as the system of FIG. 1.

FIG. 3 shows an example of a triggering event that is a processing core going offline. As shown in system diagram 300, each of the processors 110, 112 and 114 of system 100 has four (4) tasks, e.g., processor 110 has tasks 311-314, processor 112 has tasks 315-318, and processor 114 has tasks 319-322. However, a triggering event 330 occurs; the triggering event 330 is a shutdown of processor 112. This causes a manual redistribution of tasks associated with processor 112. The manual redistribution results in the system diagram 340. Tasks 315 and 316 have been redistributed from processor 112 to processor 110 and tasks 317 and 318 have been redistributed from processor 112 to processor 114. It will be apparent to those of skill in the art that the specific redistribution shown in FIG. 3 is only exemplary and that the redistribution to processors that remain online need not be equal.

Figure 4:
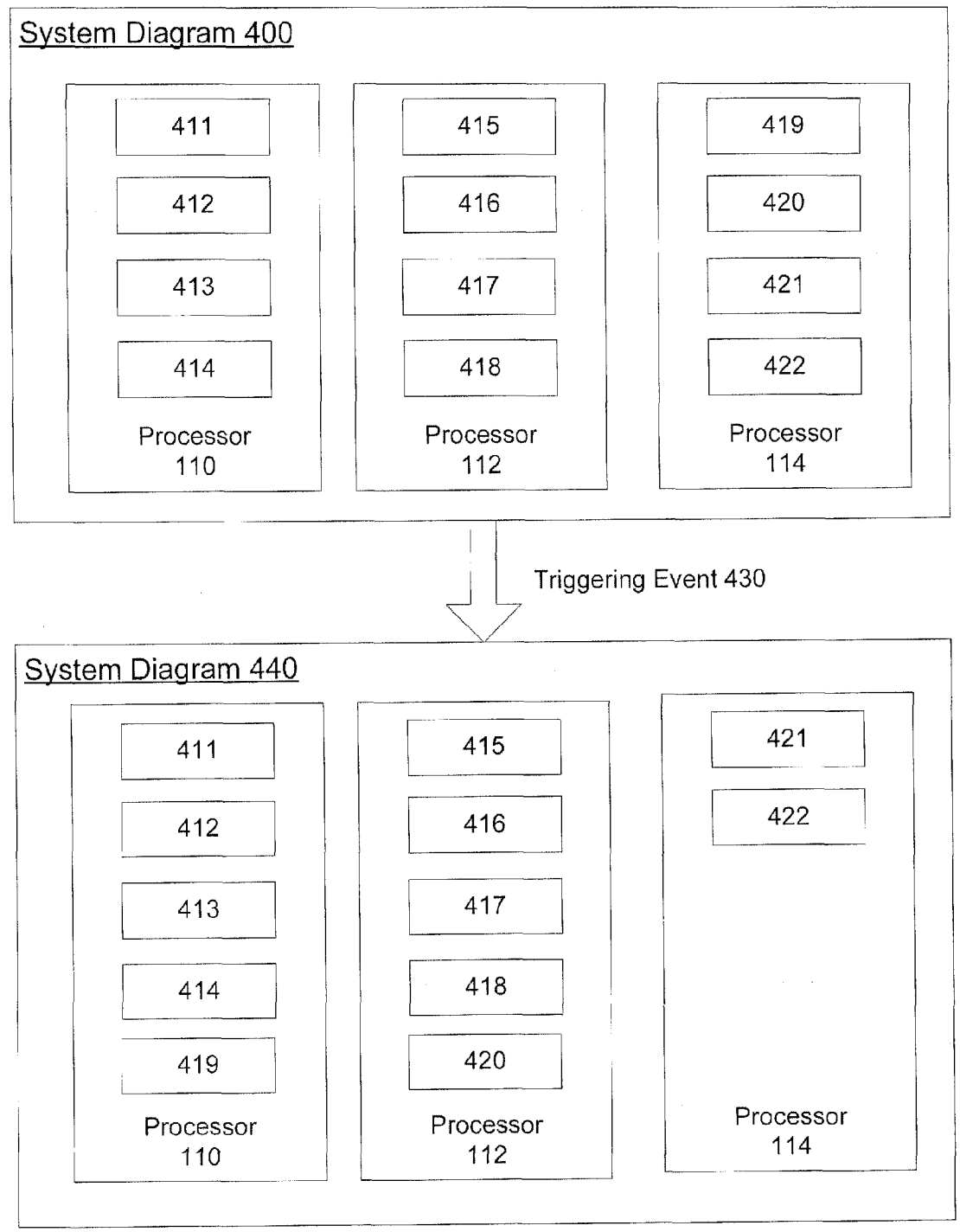
FIG. 4 shows system diagrams of a second exemplary redistribution of tasks among processors within a multi-processor computing system such as the system of FIG. 1.

In another exemplary embodiment, the triggering event may be received from an executing application. For example, the OS 160 may provide an application programming interface ("API") allowing an application to specify how to rebalance at runtime. FIG. 4 shows an example of a triggering event that is an application redistributing tasks. In the system diagram 400, each of the processors 110, 112 and 114 of system 100 has four (4) tasks, e.g., processor 110 has tasks 411-414, processor 112 has tasks 415-418, and processor 114 has tasks 419-422. However, an application executing in the system 100 has initiated a triggering event 430 that causes a redistribution of tasks. This results in system diagram 440, in which task 419 has been redistributed from processor 114 to processor 110 and task 420 has been redistributed from processor 114 to processor 112, and only tasks 421 and 422 remain at processor 114. It will be apparent to those of skill in the art that this type of redistribution may be triggered by a request from task 421 or 422 for greater processing capacity. As was the case for FIG. 3, it will be apparent to those of skill in the art that the specific redistribution shown in FIG. 4 is only exemplary.

As a further alternative, the OS 160 may include a mechanism to provide a plurality of static predetermined mappings of objects to processors based on operating conditions of the system 100. Using the elements of the exemplary system 100, a first object map could apply when all the processors 110, 112 and 114 are available, a second object map could apply when processor 114 is offline, a third object map could apply when processor 112 is offline, etc. The kernel of the OS 160 may accomplish these changes by modifying the appropriate node identifier values 220 of the task object table 200, as will be described in further detail hereinafter with reference to method 500.

The exemplary system 100, like a system using a VSP architecture, may utilize a messaging framework to accomplish communication between processors 110, 112 and 114. For example, if an application executing on one of the processors (e.g., processor 112) wishes to acquire access to a limited-access resource (e.g., a mutex), it may initiate an API of the kernel of the OS 160 including the location of the resource. The API will pass the message to the processor (e.g., processor 114) that owns the resource, which may then send a response message with instructions for accessing the resource. The message framework may obviate the need for spinlocks to coordinate communication between the processors 110, 112 and 114, as would be used in an SMP architecture. This messaging framework may use a shared memory area set aside for read/write messages, and interprocessor interrupts may be sent via the APIC 150 in order for one processor to notify another that a message is available. As a result, the rVSP system 100 may scale efficiently over increasing numbers of cores in the same manner as a VSP architecture.

Figure 5:
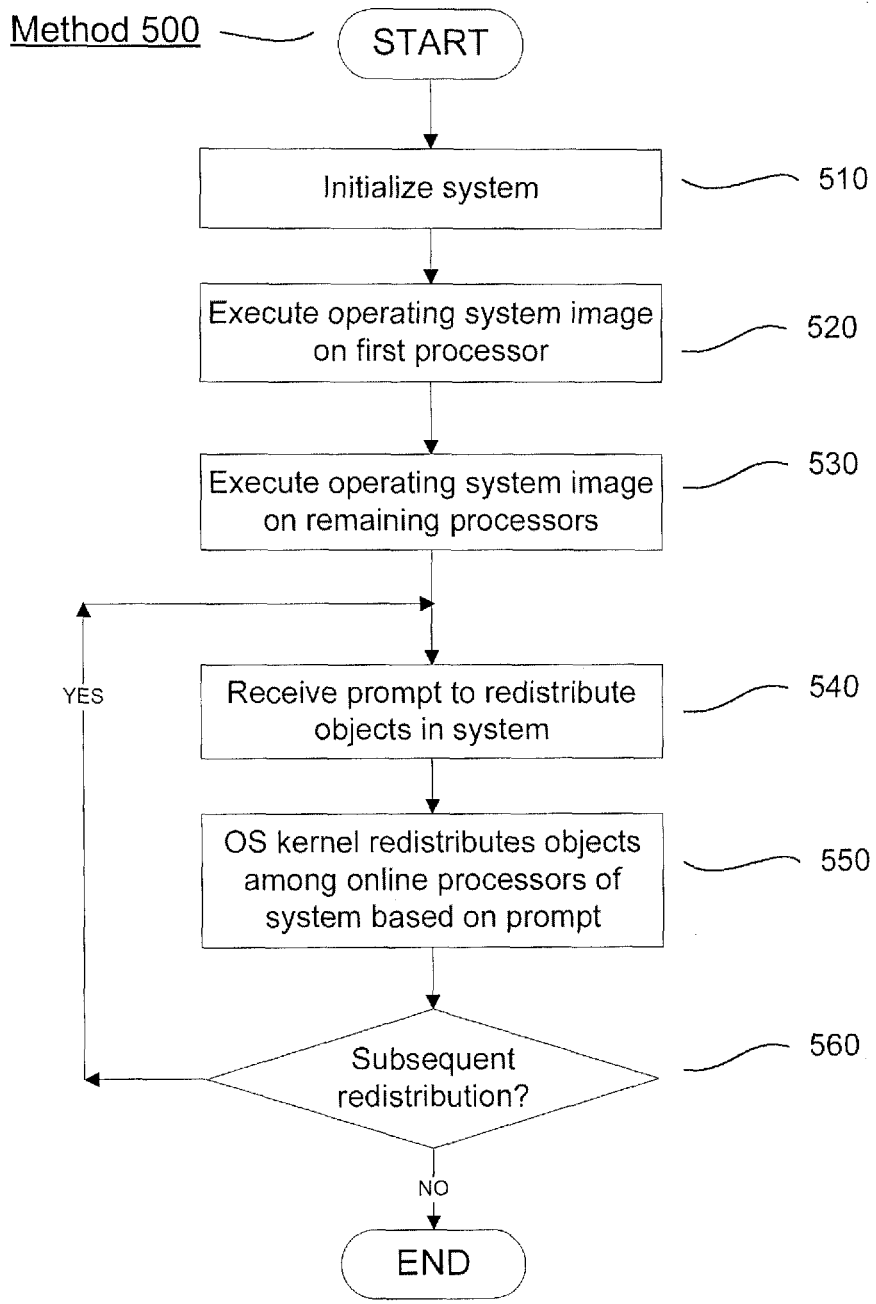
FIG. 5 shows a method for reconfigurable virtual single processor programming according to an exemplary embodiment.

FIG. 5 illustrates an exemplary method 500 by which the system 100 may be initiated and may subsequently redistribute objects among the processors 110, 112 and 114. In step 510, initialization of the system 100 is prompted. This may occur as a result of any standard system initiation command that is known in the art. In step 520, the image of the OS 160 is executed on a first one of the processors of the system 100. This may be, for example, processor 110, but it will be apparent to those of skill in the art that this is an arbitrary designation and that there is no substantive difference among the processors at this point in the performance of the method 500. As will be further apparent to those of skill in the art, this step may initiate performance of the OS 160 and the system 100.

In step 530, the same image of the OS 160 is executed on the remaining processors (e.g., processors 112 and 114). It will be apparent to those of skill in the art that this may result in the execution of the OS 160 on all the processors of the system 100. At this point, a default or predetermined object table may be in effect, and various tasks and objects may reside on processor 110, processor 112 or processor 114 as a result of this object table. Applications executing on the system 100 are provided with the appearance that the system 100 is a single-processor, rather than multi-processor, computing environment, in the same manner as is the case in a VSP computing environment. As a result, the locations of various objects within the system 100 may be reconfigured, as described above, without any applications being executed within the system 100 needing to be altered to account for the new object layout.

In step 540, a triggering event occurs to reconfigure the distribution of objects among the processors of the system 100. It will be apparent to those of skill in the art that there may be a variety of specific triggering events. As described above, the triggering event of step 540 may be due to on-lining or off-lining one of the processors of the system 100, due to a receipt of a rebalancing instruction from an application executing on the system 100 via an API of the OS 160, be due to the operating conditions of the various processors of the system 100, etc. As described above, typically, the triggering events of step 540 that may occur in a system 100 operating under an rVSP architecture may occur less frequently than in a system operating under an SMP architecture, which may redistribute objects any time rescheduling occurs.

In step 550, the kernel of the OS 160 redistributes objects among the processors of the system 100 in response to the triggering event of step 540. Redistribution in this step may be accomplished using the messaging interface described above. A message may be sent by the node at which the triggering event was received to the current owner of an object indicating the existence of a request for a change in ownership and the new owner. Considering the example illustrated in FIG. 3, processor 110 may be executing a CPU utilization task, which may determine that overall CPU utilization has fallen below some threshold. The CPU utilization task may determine that processor 112 should be shut down in order to save power, and may invoke a kernel primitive to redistribute tasks owned by processor 112 to the remaining processors. Resulting from this invocation, a series of messages may be sent from processor 110 to processor 112 requesting the redistribution of tasks 315, 316, 317 and 318.

As a result, the current owner will update the NODE_ID field in the object table (e.g., task object table 200 described above with reference to FIG. 2) to reflect the new ownership of the object, and may then forward any messages relating to the object to the new owner using the messaging interface. In contrast to an SMP system, in which the kernel's scheduling algorithm automatically causes task execution to occur on a CPU based on availability and few other attributes, in the exemplary rVSP system, object redistribution may not be automatic, and is always expressly initiated from outside the kernel.

It will be apparent to those of skill in the art that the specific redistribution may vary depending on the specific triggering event of step 540. For example, where the triggering event is either off-lining or on-lining one of the processors of the system 100, the rebalancing may take the form of an algorithm of the OS 160 that divides objects equally among processors that are on-line after the off-lining or on-lining. Where the triggering event of step 540 is an instruction received from an application being executed on the system 100, the redistribution may be as specified in such an instruction. Where the triggering event of step 540 is a rebalancing based on current operating conditions of the system 100, this may involve loading a different predetermined static mapping of objects (e.g., different from that active after step 530) based on the current operational conditions. For example, a default mapping could apply if processors 110, 112 and 114 are all online, a second mapping could apply if processor 110 is offline, a third mapping could apply if processor 112 is offline, etc. It will be apparent to those of skill in the art that any number of such static mappings may be possible.

After the redistribution of step 550, operations of the system 100 may continue as described above and in the same general manner as systems that are known to those of skill in the art. In step 560, it may be determined if a subsequent redistribution is to take place; if so, the method 500 may return to step 540 as described above. It will be apparent to those of skill in the art that step 560 is a logical construct for the purposes of illustrating the method 500 and not an actual step that takes place in the system 100. If no subsequent redistribution takes place, the method 500 terminates at this point.

The exemplary embodiments described above use a tightly-coupled shared memory hardware architecture to provide an rVSP system architecture. The rVSP system architecture may provide various advantages of both VSP architecture and SMP architecture, without the drawbacks of those architectures. The messaging interface and corresponding lack of locks required by the rVSP architecture may enable the system using this architecture to scale efficiently over increasing numbers of processors. Further, the multi-processor architecture may be transparent and may appear to applications to be a simpler single-processor architecture, obviating the need for any changes to the applications themselves to be made due to changes in the object layout within the system. Additionally, because the rVSP system architecture may allow for load rebalancing (e.g., for objects or tasks to be relocated from one processor to another), as contrasted with a VSP architecture (e.g., in which objects and tasks are fixed at corresponding processors), it may be more adaptable to changing circumstances and may enable processors to be off-lined or on-lined in a more efficient manner.

Those of skill in the art will understand that the above-described exemplary embodiments may be implemented in any number of matters, including as a software module, as a combination of hardware and software, etc. For example, the exemplary method 500 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A non-transitory computer-readable storage medium storing a set of instructions that are executable by a processor, the set of instructions, when executed by one or more processors of a multi-processor computing system, causing the one or more processors to perform operations comprising:
    initiating a first processor of the multi-processor computing system with an operating system image of an operating system, the operating system image including a plurality of predetermined object maps;
    initiating a second processor of the multi-processor computing system with the operating system image;
    placing a plurality of system objects on corresponding processors according to a first predetermined object map;
    receiving a triggering event causing a change to one or more of the processors;
    invoking a second predetermined object map based on current operating conditions of the multi-processor computing system; and
    relocating one or more of the system objects to a different one of the processors according to the second predetermined object map.

2. The non-transitory computer-readable storage medium of claim 1, wherein the multi-processor computing system comprises a tightly-coupled shared memory computing system.

3. The non-transitory computer-readable storage medium of claim 1, wherein the plurality of predetermined object maps comprise one of system object locations and task locations.

4. The non-transitory computer-readable storage medium of claim 1, wherein the triggering event comprises one of on-lining and off-lining one of the processors.

5. The non-transitory computer-readable storage medium of claim 4, wherein one of the predetermined object maps comprises distributing system objects evenly among the plurality of processors that are on-line after the one of on-lining and off-lining.

6. The non-transitory computer-readable storage medium of claim 1, wherein the triggering event comprises receiving an indication from an executing application.

7. The non-transitory computer-readable storage medium of claim 1, wherein the current operating conditions are defined by a subset of the plurality of processors that are currently available.

8. The non-transitory computer-readable storage medium of claim 1, wherein the operating system is a microkernel operating system.

9. The non-transitory computer-readable storage medium of claim 1, wherein the operating system comprises a shared memory-based messaging interface providing communications among the plurality of processors.

10. A system, comprising:
    a plurality of processors; and a memory shared by the plurality of processors, the memory storing an operating system image, the operating system image including a plurality of predetermined object maps placing a plurality of system objects on corresponding processors according to a first predetermined object map, wherein the system is initiated by initiating a first processor of the plurality of processors with the operating system image and initiating a second processor of the plurality of processors with the operating system image, and wherein a kernel of the system receives a triggering event causing a change to one or more of the processors, invokes a second predetermined object map based on current operating conditions of the system, and relocates one or more of the system objects to a different one of the processors according to the second predetermined object map.

11. The system of claim 10, wherein the plurality of predetermined object maps comprise one of system object locations and task locations.

12. The system of claim 10, wherein the triggering event comprises one of on-lining and off-lining one of the plurality of processors.

13. The system of claim 12, wherein one of the predetermined object maps comprises distributing system objects evenly among the plurality of processors that are on-line after the one of on-lining and off-lining.

14. The system of claim 10, wherein the triggering event comprises receiving an indication from an executing application.

15. The system of claim 10, wherein the current operating conditions are defined by a subset of the plurality of processors that are currently available.

16. The system of claim 10, wherein the operating system is a microkernel operating system.

17. The system of claim 10, wherein the operating system comprises a shared memory-based messaging interface providing communications among the plurality of processors.

18. A method, comprising:
 initiating a first processor of a multi-processor computing system with an operating system image of an operating system, the operating system image including a plurality of predetermined object maps;
 initiating a second processor of the multi-processor computing system with the operating system image;
 placing a plurality of system objects on corresponding processors according to a first predetermined object map;
 receiving a triggering event causing a change to one or more of the processors;
 invoking a second predetermined object map based on current operating conditions of the multi-processor computing system; and
 relocating one or more of the system objects to a different one of the processors according to the second predetermined object map.

* * * * *